(12) United States Patent
Bitzi et al.

(10) Patent No.: US 10,577,220 B2
(45) Date of Patent: Mar. 3, 2020

(54) POSITION-DETERMINATION SYSTEM FOR AN ELEVATOR

(71) Applicant: INVENTIO AG, Hergiswil (CH)

(72) Inventors: Raphael Bitzi, Lucerne (CH); Daniel Scherrer, Zürich (CH); Steven Brossi, Zürich (CH)

(73) Assignee: INVENTIO AG, Hergiswil NW (CH)

( * ) Notice: Subject to any disclaimer, the term of this patent is extended or adjusted under 35 U.S.C. 154(b) by 366 days.

(21) Appl. No.: 15/534,596

(22) PCT Filed: Dec. 14, 2015

(86) PCT No.: PCT/EP2015/079553
§ 371 (c)(1),
(2) Date: Jun. 9, 2017

(87) PCT Pub. No.: WO2016/096697
PCT Pub. Date: Jun. 23, 2016

(65) Prior Publication Data
US 2017/0349400 A1     Dec. 7, 2017

(30) Foreign Application Priority Data
Dec. 16, 2014   (EP) ..................................... 14198352

(51) Int. Cl.
*B66B 1/34*     (2006.01)
*G06T 7/80*     (2017.01)
(Continued)

(52) U.S. Cl.
CPC .............. *B66B 1/3492* (2013.01); *B66B 1/30* (2013.01); *B66B 5/0018* (2013.01);
(Continued)

(58) Field of Classification Search
CPC ... B66B 7/1238; B66B 1/3492; B66B 5/0018; B66B 1/28; B66B 5/0012
See application file for complete search history.

(56) References Cited

U.S. PATENT DOCUMENTS

2002/0104716 A1 *  8/2002  Zaharia ................. B66B 1/3492
                                                      187/394
2002/0112926 A1 *  8/2002  Siberhorn ............. B66B 1/3492
                                                      187/394
(Continued)

FOREIGN PATENT DOCUMENTS

CN          1720188 A      1/2006
DE         10141412 A1     3/2003
(Continued)

*Primary Examiner* — Marlon T Fletcher
(74) *Attorney, Agent, or Firm* — William J. Clemens; Shumaker, Loop & Kendrick, LLP

(57) ABSTRACT

A position-determination system for an elevator uses a camera arranged on an elevator car, which camera has a sensor with a defined number of light-sensitive pixels for generating image data of a surface structure of hoistway material arranged along a travel path of the elevator car. An analysis unit, based on the image data, determines a position and/or velocity of the elevator car. The position-determination system recognizes a reference pattern with a specified dimension which lies in a capturing range of the camera, wherein, based on the reference pattern, the analysis unit performs a scaling of the image data.

15 Claims, 3 Drawing Sheets

(51) Int. Cl.
*G06T 7/70* (2017.01)
*B66B 1/30* (2006.01)
*B66B 5/00* (2006.01)
*G01B 11/02* (2006.01)
*G01P 3/38* (2006.01)
*G06K 9/62* (2006.01)
*G06T 7/20* (2017.01)

(52) U.S. Cl.
CPC ............ *G01B 11/022* (2013.01); *G01P 3/38* (2013.01); *G06K 9/6202* (2013.01); *G06T 7/20* (2013.01); *G06T 7/70* (2017.01); *G06T 7/80* (2017.01); *G06T 2207/10016* (2013.01); *G06T 2207/10028* (2013.01); *G06T 2207/10048* (2013.01)

(56) References Cited

U.S. PATENT DOCUMENTS

| | | | |
|---|---|---|---|
| 2007/0095617 A1* | 5/2007 | Finn | B66B 1/3492 187/393 |
| 2013/0001023 A1* | 1/2013 | Leutenegger | B66B 1/3492 187/394 |
| 2017/0349400 A1* | 12/2017 | Bitzi | B66B 1/3492 |
| 2017/0355558 A1* | 12/2017 | Khalil | B66B 5/0031 |

FOREIGN PATENT DOCUMENTS

| | | |
|---|---|---|
| EP | 1232988 A1 | 8/2002 |
| TW | 200304330 A | 9/2003 |
| TW | I261466 B | 9/2006 |
| WO | 2006073015 A1 | 7/2006 |

\* cited by examiner

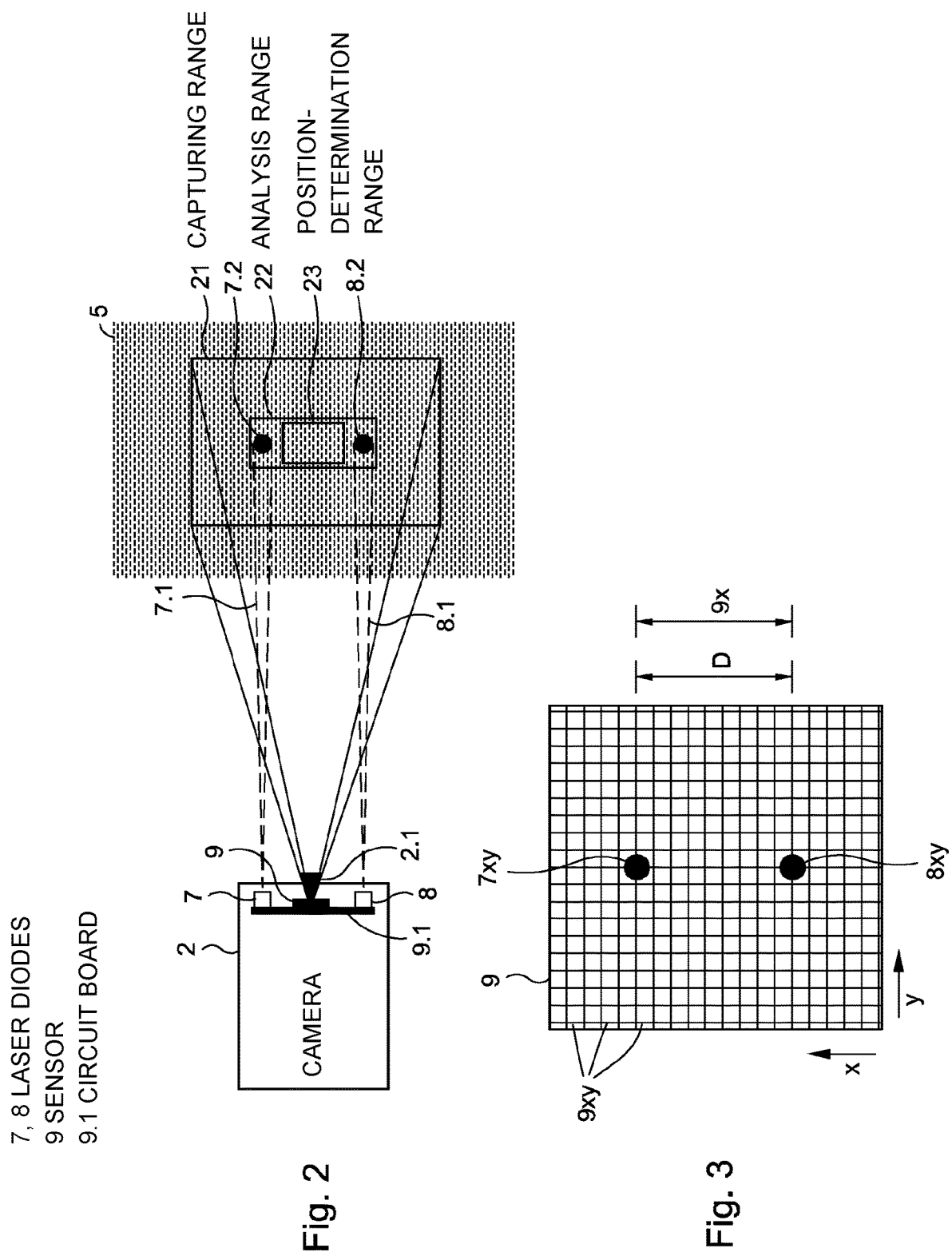

POSITION-DETERMINATION SYSTEM FOR AN ELEVATOR

FIELD

The invention relates to the field of the determination of a position, in particular of an absolute position of an elevator car by means of the analysis of a surface structure of hoistway material; in particular, the invention relates to a position-determination system for an elevator, which determines a position on the basis of a surface structure of hoistway material.

BACKGROUND

The patent disclosure EP 1 232 988 A1 shows an elevator system with a position-determination system for determining a position of an elevator car. This position-determination system comprises a camera, which is arranged on the elevator car, and is used to generate images of hoistway material and/or of the surface structure of this hoistway material. To be regarded as hoistway material are guiderails and further elevator components that are arranged in the hoistway, as well as the hoistway walls that bound the hoistway. The hoistway material in its entirety forms a surface structure which essentially extends along the travel path of the elevator car. This surface structure constantly changes, so that each generated image of the surface structure is unique and can serve as an indicator for a position of the elevator car. In a learning travel, the camera generates reference images of the surface structure. An analysis unit that is connected with the camera identifies these reference images to a position in the hoistway and writes the reference images and the identified position values to a memory medium. In normal operation, based on a comparison of the images that are constantly generated by the camera with the reference images that have been saved, a position of the elevator car can be determined by the analysis unit.

For the robustness of the determination of the position, vibrations in the elevator car prove to be particularly critical. For example, the vibrations act negatively on the maintenance of a constant distance between the camera and the surface structure, since an object that is photographed by the camera appears, at a lesser distance, larger than at a greater distance. This variance in the distance from the surface structure presents the analysis unit, when determining the position, with special challenges since, for example, the size of the reference images does not match that of the constantly generated images and hence impedes a unique identification of the reference images. In addition, with a variable distance between the camera and the surface structure, it is not possible to deduce the true dimensions of the pattern based on the pattern that is identified from the images. For this, patent disclosure EP 1 232 988 A1 does not propose a solution.

SUMMARY

It is therefore a task of the invention to increase the robustness of such a position-determination system.

According to the invention, this task is solved by a position-determination system for an elevator, which has a camera and an analysis unit. The said camera is arranged on an elevator car. Moreover, the camera contains a sensor with a defined number of light-sensitive pixels. By means of this sensor, the camera generates image data of a surface structure of hoistway material that is situated along a travel path of the elevator car. Based on the image data, the analysis unit determines a position and/or a velocity of the elevator car. The solution is characterized in that the position-determination system is designed to recognize a reference pattern with a specified dimension that lies within the capturing range of the camera and, based on the reference pattern, the analysis unit performs a calibration of the sensor.

Consequently, the expression "position" shall be used generally to include also a velocity of the elevator car which can be derived from the values of the position.

"Calibration of the sensor" is here understood to mean the determination of a dimension of a pattern of the surface structure that is captured as image by the sensor. The determination of the car position depends to a large extent on the exact determination of the dimensions of a pattern that is detected by the sensor. The said calibration can very easily be undertaken by reference to a reference pattern with the specified dimensions that is present in the capturing range of the camera.

In the image of the camera, a pattern that is captured by the camera appears, at a lesser distance from the surface structure, larger than at a greater distance from the surface structure. Hence, the true dimensions of the pattern cannot readily be deduced from the pattern that is recognized as image. Here, the reference pattern provides a remedy, since the reference pattern is subject to a change in size in the image, depending on the distance, to the same extent as the pattern. Thanks to the reference pattern, the pattern can be set in relation to a specified dimension of the reference pattern. During the calibration by means of the reference pattern, a measurement of a pattern is thus possible, irrespective of the distance between the camera and the surface structure. The calibration within the meaning of the present invention can, in particular, also include a scaling by means of the reference pattern of the pattern that is contained in the image data.

Here, the term "camera" is to be understood broadly and to include all image-capturing systems that can depict a surface structure, and, besides conventional cameras, shall also include, for example, infra-red cameras, scanners, x-ray cameras, ultrasonic image-generating systems, and suchlike.

The surface structure is formed by the entirety of the hoistway material that is installed in a hoistway and is arranged locationally fixed relative to the hoistway. Here, the hoistway material shall include elevator components, such as, for example, guiderails and hoistway doors, as well as the hoistway walls that bound the hoistway. The hoistway material has surfaces with a constantly changing characteristic over the height of the hoistway with respect to the texture, roughness, color, pattern, form, and/or contour. This composite surface with its own characteristic is understood here as "surface structure". Hence, over the height of the hoistway, the surface structure forms a continuously changing, non-repeating code, which can be analyzed as image. Based on reference images that are captured in a learning travel, and to which a position in the hoistway is identified, through an image-comparison of continuously captured images with these same reference images, a position of the elevator car at any point-in-time can be determined.

Under a "capturing range" of the camera, here, the range on the surface structure is to be understood, which, at a particular point-in-time is within the field of vision of the camera and which the camera can photograph. The capturing range is the largest-possible range that can be photographed by the camera at a particular point-in-time.

Under "reference pattern", here, preferably a pattern with specifiable, essentially unchanging dimensions is to be understood. The reference pattern thus provides a comparison value, to which reference is made for the calibration of the sensor. In principle, all patterns are suitable as reference patterns which are recognizable as image by the camera and analyzable by the analysis unit. These include, for example, circles with a specified diameter as dimension, polygons with a specified height or width, at least two points with a specified separation, or a specified two-dimensional matrix code, to mention some simple examples.

Suitable as sensor for the camera are, for example, a charge-coupled device (CCD) sensor or complementary metal-oxide-semiconductor (CMOS) sensor with a matrix of light-sensitive pixels.

Preferably, the analysis unit for the calibration of the sensor relates the specified dimension of the pattern to the number of pixels that represent this dimension as image. The size of an object that is captured by the sensor is then determinable in simple manner, irrespective of the distance of the camera from the surface structure.

Particularly advantageous is an analysis of the pixels that convert a dimension as image, with an analysis accuracy that exceeds the pixel resolution. Such an analysis is referred to as "sub-pixel accuracy". In such an analysis, for example, a focal point, or an edge, of a pattern that is contained in the reference pattern is determined and used as reference value for the calibration of the sensor. In the calibration, also a plurality of these reference values can be used.

Correspondingly, the aforesaid number of pixels contains not only integral values but possibly also a fraction of a pixel that results from the analysis.

Preferably, the image data that are generated when determining the position and/or the velocity from the relationships that are derived from the calibration are scalable. It is also advantageous if errors that occur when determining the position values and/or the velocity values, which are attributable to the variance of the distance of the camera from the surface structure, are correctable by means of the calibration and/or scaling. By this means, a continuous correction of the generated image data is achievable.

Preferably, the camera has an adjustable analysis range. In the analysis range, image data can be generated that are analyzed by the analysis unit. The analysis range lies within the capture range and can preferably be set smaller than the capture range, with the reference pattern lying within the analysis range. In an alternative embodiment, the analysis range can also occupy the entire capture range.

Under "analysis range", a sub-range of the capture range is understood, in which image data from the analysis unit are taken into account for an analysis. In addition to the analysis of the reference pattern for calibration purposes, this also relates to the analysis of image data for determining the position of the elevator car. Thanks to the definition of an analysis range, the computing capacity of the analysis unit can be kept relatively small, since only a reduced number of the pixels need be taken into account for an image analysis. In addition, boundary effects of the sensor, which can negatively affect the analysis of the image data, can be minimized.

Preferably, the camera has an adjustable position-determination range, in which image data are capturable, based on which the analysis unit determines the position of the elevator car, in particular by means of a comparison of the captured image data with image data of a reference image that is identified to a position in the hoistway, which lies in the analysis range and, in particular, is adjustable to be smaller than the analysis range.

Under "position-determination range", a sub-range of the analysis range is to be understood, in which the image data that are generated by the sensor are drawn upon for the comparison with the image data of the saved reference images. The advantage of defining in the analysis range a further sub-range, namely the position-determination range, lies in the identifiability of a function fulfillment that is provided specifically for this range, as explained further below by reference to an example.

Preferably, the position-determination system contains a light source, which generates a reference pattern on the surface structure. The reference pattern also lies within a capturing range of the camera.

Preferably, the reference pattern comprises at least two light-points, which can be generated in a specified dimension, in particular a separation, from each other, on the surface structure. The analysis unit then performs a calibration of the sensor based on the distance between the two light points.

Preferably, the two light-points can be generated vertically offset, in particular vertically adjacent, on the surface structure. Through the vertical offset of the two light-points, the calibration of the sensor in the vertical direction is assured. The calibration of the sensor in the vertical direction is particularly important for reliable position-determination of the elevator car in the travel direction. Alternatively, however, it is entirely conceivable to generate the light-point horizontally offset on the surface structure, in particular when a pixel separation in vertical direction is identical to the pixel separation in horizontal direction, or is related to it in a fixed, specified, dimensional relationship.

Preferably, the two light-points lie outside the position-determination range. In particular, an upper light-point lies above the position-determination range and a lower light-point lies below the position-determination range. Advantageous here is that the analysis of the light-points and the analysis of the image data of the surface structure take place in different areas of the analysis range. The calibration and the position-determination can then take place simultaneously, without the light-points influencing the position-determination.

Preferably, the light-source comprises a first and a second laser diode. The first laser diode emits a first laser beam and the second laser diode emits a second laser beam. The first laser beam then generates the first light-point and the second laser beam generates the second light-point on the surface structure.

Preferably, the first laser beam and the second laser beam are aligned parallel to each other. Thanks to the parallel alignment of the two laser beams, the separation between the light-points that are generated by the laser beams remains constant, even with a variable distance between the camera and the surface structure. A particularly reliable calibration of the sensor and/or of the pixel size can then take place even in the event of large vibrations in the distance between the camera and the surface structure.

Preferably, the first and the second laser diode, the sensor, and/or a lens of the camera, are integrated on a circuit board of the sensor. This is particularly advantageous, because through the integral construction of the sensor, a construction of the camera is achieved that is as inexpensive and compact as possible.

Alternative to a light-source that generates a reference pattern on the surface structure, preferably, the reference pattern can be generated by means of a reference object that is arranged on the surface structure. Then, the reference object lies at least part of the time in the capturing range of the camera. In order to assure a calibration of the sensor at regular time intervals, a plurality of reference objects can also be provided on the surface structure along the travel path of the elevator car.

Preferably, the reference object takes the form of one of the following embodiments, namely, a screw-head, a rail-fastening element, or a code-mark. It is particularly advantageous to use as reference object one or more components, such as, for example, a head of a screw, which is anyway already provided for fastening a guiderail. Additional reference objects can then be obviated.

In a further aspect, the solution relates to an elevator with a position-determination system as described above. Therein, the analysis unit transmits the position data of the elevator car to the elevator control. Finally, using the position data, the elevator control addresses a drive unit in order to cause the elevator car to travel.

DESCRIPTION OF THE DRAWINGS

Preferred exemplary embodiments of the invention are explained in more detail in the description that follows, by reference to the attached figures. Shown are in:

FIG. 2 a detail of the position-determination system in a greatly simplified schematic representation, with a functional representation of the calibration by means of two light-points;

FIG. 3 an exemplary embodiment of a sensor of the camera in a greatly simplified schematic representation, and the illustration of the calibration by means of two light-points;

DETAILED DESCRIPTION

Figure 1:
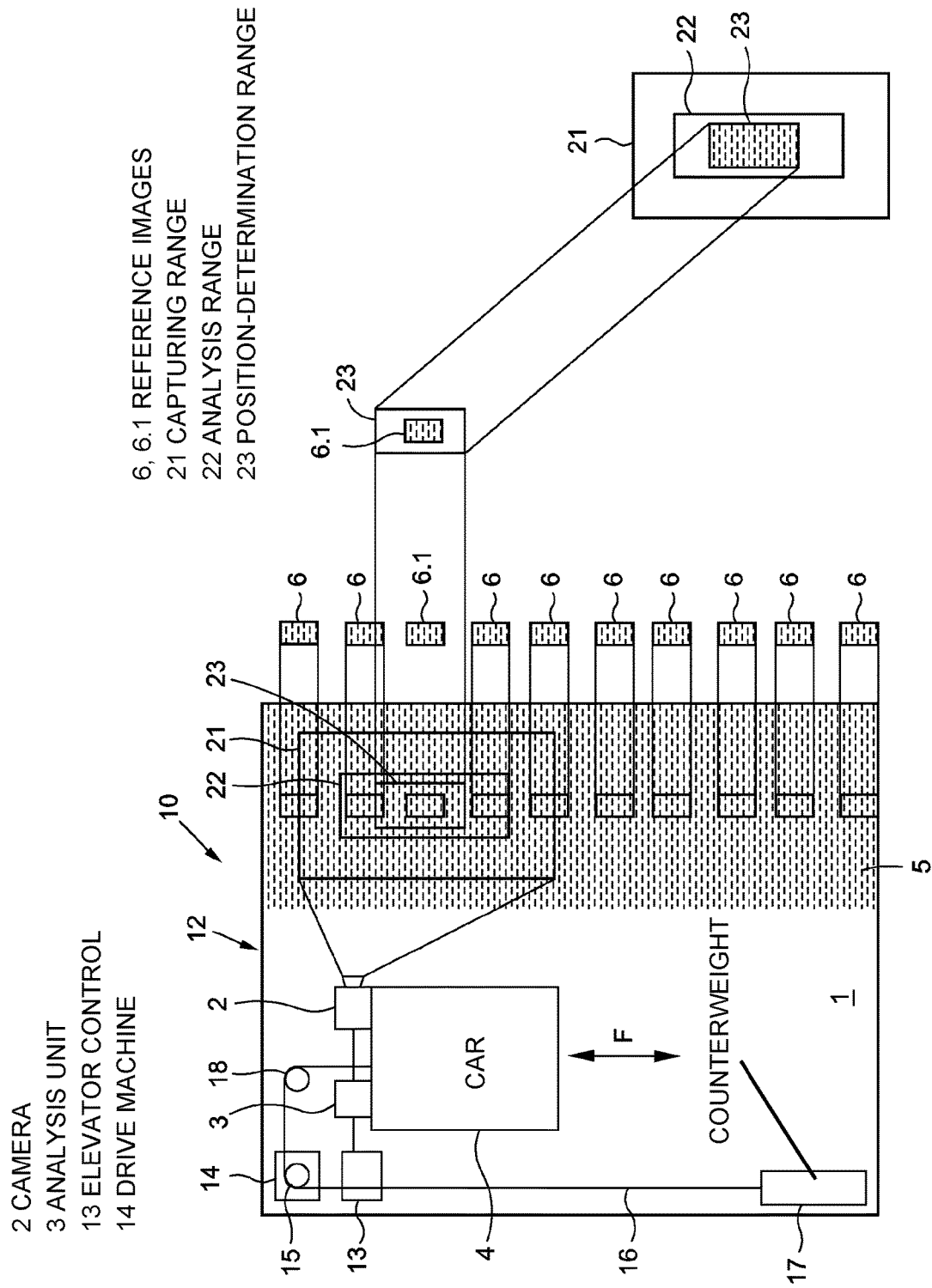
FIG. 1 an exemplary embodiment of an elevator system, in a greatly simplified schematic representation, with a position-determination system and a functional representation of the position-determination.

FIG. 1 shows an elevator 10 with an elevator car 4, which can travel along guiderails (not shown), or along a travel path F, in a hoistway 1. The elevator car 4 is suspended on a first end of a suspension means or apparatus 16 with a roping factor of 1:1. Self-evidently, the expert can select a different roping factor of 2:1 or more. To compensate the weight-force of the elevator car 4, a counterweight 17 is provided, which is suspended on a second end of the suspension means 16.

In addition, a drive unit is provided, which comprises at least one drive machine 14 and a traction sheave 15, which is driven by the drive machine 14. The suspension means 16 passes over the traction sheave 15 and is mechanically engaged with the latter, so that a driving torque of the drive machine 14 can be transmitted through the traction sheave 15 to the suspension means 16. The suspension means 16 also passes over a diverter sheave 18.

The elevator 10 further contains a camera 2, which is arranged on the elevator car 4. The camera 2 is part of a position-determination system 12 and generates images of the surface structure 5 of hoistway material. In FIG. 1, the surface structure is shown hatched.

In a learning travel, the camera 2 captures reference images 6 of the surface structure 5, which are saved to a not-shown storage medium. In FIG. 1, for reasons of clarity, a certain distance is shown between the reference images. The image-repetition frequency of capturing the reference images 6 can, however, also be set so high that adjacent reference images 6 directly adjoin each other or have an overlap area. Then, also a continuous reference image can be captured and saved on the storage medium. In a travel during normal operation of the elevator 10, the camera 2 continuously generates images of the surface structure 5. The images are analyzed in an analysis unit 3. This analysis consists of a comparison between the previously written reference images 6, which are identified to a position in the hoistway 1, with the images that are continuously generated during the travel of the elevator car 4. The analysis unit 3 thereby determines a position of the elevator car 4. The analysis unit 3 makes this position available to the elevator control 13, the elevator control 13 using the position data to address the drive unit, in order to cause the elevator car 4 to travel in the travel direction F.

For example, in FIG. 1, the capturing range 21 of the camera 2 is directed at a hoistway wall that bounds the hoistway 1. The capturing range 21 is the largest range that can be captured by the camera 2. Correspondingly, the camera 2 generates image data of the surface structure 5 of the hoistway wall, which are at least partly analyzed by the analysis unit 3. Since, to reduce boundary effects, and to keep the computing capacity of the analysis unit 3 within limits, the camera 2 has a specifiable analysis range 22. The image data that are contained in the analysis range 22 are subjected to an analysis in the analysis unit 3. In the exemplary embodiment that is shown, the camera 2 also has a position-determination range 23. In the image of the surface structure 5, which lies in the position-determination range 23, a match with one of the saved reference images 6 is sought.

In FIG. 1, by exemplary reference to a reference image 6.1, it is shown how the image analysis of the image data that are supplied by the camera 2 takes place in the analysis unit 3. The camera 2 continuously captures images of the surface structure 5, but here, as indicated at bottom right in FIG. 1, only the image data that lie in the position-determination range 23 are sent to the analysis unit 3 for an analysis. In a further step, in the image data of the position-determination range 23, a match with a reference image 6.1 is sought, and, in the event of a match, the position of the elevator car 4 is deduced.

FIG. 2 shows in a greatly schematized representation an exemplary embodiment of a camera 2, which, by means of laser diodes 7, 8, performs a calibration of the sensor 9 and/or of the pixel size of the sensor 9.

The camera 2 comprises a lens 2.1, a light-sensitive sensor 9, and two laser diodes 7, 8. In the example that is shown, the aforesaid components of the camera 2 are integrated on a circuit board 9.1 of the sensor 9. Self-evidently, the invention is not restricted to these embodiments of the camera 2, but comprises all embodiments of the camera that can generate in a required resolution, and at the required speed, image data of a surface structure 5 and are also designed to perform a calibration according to the invention.

In the example that is shown, the capturing range 21 of the camera 2 is directed to a surface structure 5 of the hoistway 1. The two laser diodes 7, 8 each generate a laser beam 7.1, 8.1, which each generate in the analysis range 22 of the camera 2 a light-point 7.2, 8.2 as reference pattern. However, the two light points 7.2, 8.2 lie outside the position-determination range 23. Finally, here, as already described in the example according to FIG. 1, a position-determination range 23 is provided. A first light-point 7.2 lies above, and a second light-point 8.2 lies below, the position-determination range 23. This results within the analysis range 22 in ideal manner in two ranges, whereof a first range generates image data for performing a calibration, and a second range, which corresponds to the position-determination range 23, generates image data for determining the position. Thanks to the clear separation, these two functions can be performed continuously and independent of each other.

The two laser beams 7.1, 8.1 that are generated by the light diodes 7, 8 are aligned parallel to each other and shine essentially perpendicularly onto the surface structure 5. Thanks to these measures, the two light points 7.2, 8.2 appear with a constant separation on the surface structure 5. This enables a calibration of the pixels of the sensor 9 even with a changing distance between the camera 2 and the surface structure 5.

FIG. 3 shows in greater depth how the calibration of the exemplary embodiment according to FIG. 2 is performed. FIG. 3 shows the sensor 9 in a plan view in a greatly simplified representation without taking into account the relative sizes and irrespective of the previously presented subdivision of the range. The focus is on illustrating the basic principle of the calibration. The sensor 9 has a matrix of light-sensitive pixels $9xy$, which extends in the two directions x and y. Further, in FIG. 3, two images of the light-points $7xy$ and $8xy$ on the sensor 9 can be seen. The two light-points $7xy$, $8xy$ are separated by a specified distance D, which is known to the analysis unit 3 (not shown in FIG. 3). To calibrate the dimension of the pixel $9xy$, the analysis unit relates the distance D to the number of pixels $9xy$, here, for example, nine in number, that lie between the two light-points $7xy$, $8xy$. Hence, in the present example, the calibration results in a relation V between the distance D and the number of pixels $9xy$, which represents the distance D as image, of $$V=D/9x.$$

The sub-pixel accuracy that was stated at the outset can, in this exemplary embodiment, be achieved in that, for each light-point $7xy$, $8yx$ a focal point is formed. The distance D is then set in relation to the number of pixels $9xy$ between the focal points, in order to determine the relation V that underlies the calibration.

Figure 4:
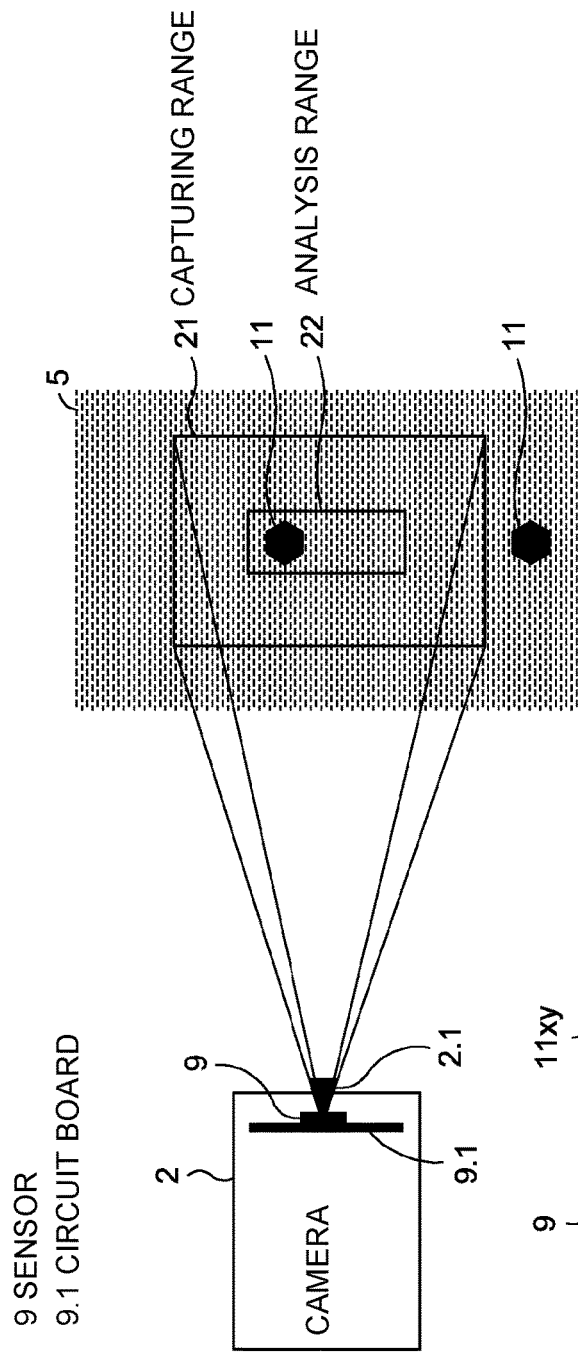
FIG. 4 a detail of the position-determination system in a greatly simplified schematic representation, with a functional representation of the calibration by means of an object.

In FIG. 4 a further exemplary embodiment is represented, in which, by means of at least one object 11, here a screw-head 11, a reference pattern is generated. Based on this screw-head and/or a specified dimension of the screw-head, a calibration of the sensor 9 and/or the pixel size of the sensor 9 is performed. Self-evidently, objects that deviate herefrom can also be used.

Here, the camera 2 contains a lens 2.1 and a light-sensitive sensor 9, both of which are integrated in a circuit board 9.1.

Also in this example, the capturing range 21 of the camera 2 is directed onto a surface structure 5 of the hoistway 1. Visible on the surface structure 5 are two screw heads 11, which, for example, are part of a fastening system of a guiderail. The screw heads 11 represent, on the one hand, objects with a specified dimension, which can be used for the calibration of the sensor 9; on the other hand, the two screw heads 11 are also part of the surface structure and themselves represent a structure, which can be analyzed within the scope of the position-determination by the analysis unit.

Hence, a division of the analysis range 22 into further sub-ranges, as previously into a position-determination range, can be obviated, since a screw head 11 that lies in the analysis range 22 generates image data which, in the analysis unit 3, are simultaneously input to a position-determination and a calibration.

Figure 5:
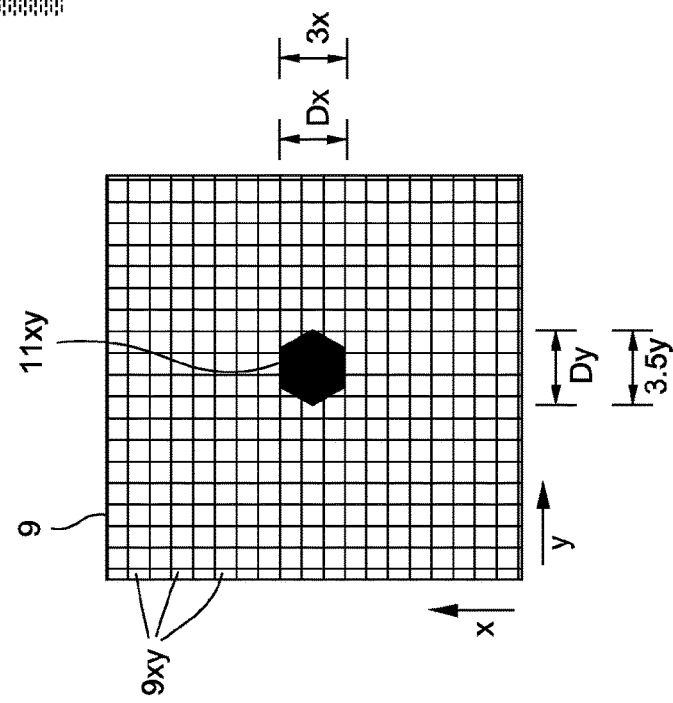
FIG. 5 an exemplary embodiment of a sensor of the camera in a greatly simplified schematic representation and the illustration of the calibration means of a reference object.

FIG. 5 shows in greater depth how the calibration of the exemplary embodiment according to FIG. 4 is performed. FIG. 5 shows the sensor 9 in a plan view in a greatly simplified representation without taking into account the relative sizes and irrespective of the previously presented subdivision of the range. The focus is on illustrating the basic principle of the calibration. The sensor 9 has a matrix of light-sensitive pixels $9xy$ which extend in the two directions x and y. Also visible in FIG. 5 is an image of the screw-head $11xy$ and of the sensor 9. On the sensor 9, the screw-head $11xy$ is represented as a two-dimensional object. Correspondingly, both in the x direction and in the y direction, the screw-head $11xy$ possesses a specified dimension, namely a diameter Dx and a diameter Dy. Each of these specified diameters Dx, Dy is known to the (not shown) analysis unit 3 and can be used for the calibration. In the example shown, the analysis unit sets the distance Dx and/or Dy in relation to the number of pixels $9xy$ in the respective directions. Here, the two diameters Dx, Dy each extend over 3 and 3.5 pixels $9xy$ respectively. Hence, in the present example, the calibration yields a ratio of Vx, Vy between the two diameters Dx, Dy and the number of pixels $9xy$, which represent the two diameters Dx, Dy as image, of $$Vx=D/3x \text{ and}$$

$$Vy=D/3.5y.$$

By this means, in this exemplary embodiment, the sub-pixel accuracy that was mentioned at the outset can be attained, through two oppositely positioned edges of the screw-head 11 being recognized and their separation determined. The diameter Dx is then set in relation to the number of pixels $9xy$ that are situated between the two edges, in order to determine the underlying relation Vx, Vy of the calibration.

The values for a ratio V between the specifiable dimension D and the number of pixels $9xy$, which are obtained from the scaling, which these dimensions D represent as image, are preferably used when determining the position. The sensor 9 and/or the image data that are captured by the sensor 9, which are compared with a reference image 6 are calibratable and/or scalable in such manner. This substantially facilitates the identification of an image of the surface structure 5, which is present in the image data, to a reference image 6, whose position in relation to the hoistway 1 is known and/or defined, and thereby results in a robust and reliable determination of a position of the elevator car 4.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A position-determination system for an elevator with an elevator car movable along a travel path in a hoistway, comprising:
   a camera arranged on the elevator car and having a sensor with a defined number of light-sensitive pixels, the camera generating by the sensor image data of a surface structure of hoistway material arranged along the travel path of the elevator car;

an analysis unit that determines at least one of a position of the elevator car and a velocity of the elevator car in the hoistway based on the image data; and wherein the position-determination system recognizes a reference pattern with a specified dimension, wherein the reference pattern lies in a capturing range of the camera, and wherein the analysis unit performs a calibration of the sensor based on a determination of a dimension of the reference pattern in the image data.

2. The position-determination system according to claim 1 wherein for the calibration of the sensor, the analysis unit sets the specified dimension of the reference pattern in relation to a number of the pixels that represent the specified dimension as an image.

3. The position-determination system according to claim 2 wherein when determining the position or the velocity by the relation that is derived from the calibration, the generated image data are scalable.

4. The position-determination system according to claim 1 wherein the camera has an adjustable analysis range in which the image data are captured, wherein the analysis range lies within the capturing range, wherein the analysis range can be adjusted to be smaller than the capturing range, and wherein the reference pattern lies within the analysis range.

5. The position-determination system according to claim 4 wherein the camera has an adjustable position-determination range in which the image data are capturable, and wherein the analysis unit determines the position or the velocity of the elevator car by a comparison of the generated image data with image data of a reference image that is identified to a position that lies in the analysis range and wherein the position-determination range is adjustable to be smaller than the analysis range.

6. The position-determination system according to claim 1 including a light-source that generates the reference pattern on the surface structure, wherein the reference pattern lies in the capturing range of the camera.

7. The position-determination system according to claim 6 wherein the reference pattern contains at least two light-points that are generated in a specified dimension separation from each other on the surface structure, wherein, based on the separation between the two light-points, the analysis unit performs the calibration of the sensor.

8. The position-determination system according to claim 6 wherein the camera has an adjustable analysis range in which the image data are captured, wherein the analysis range lies within the capturing range, wherein the camera has an adjustable position-determination range in which the image data are capturable, wherein the adjustable position-determination range lies within the analysis range, wherein the reference pattern lies within the analysis range, wherein the light-source generates the reference pattern on the surface structure as an upper light-point that lies above the position-determination range and a lower light-point that lies below the position-determination range.

9. The position-determination system according to claim 6 wherein the reference pattern contains at least two light-points that are generated in a specified dimension separation from each other on the surface structure, wherein, based on the separation between the two light-points, the analysis unit performs the calibration of the sensor, and wherein the two light-points are vertically offset on the surface structure.

10. The position-determination system according to claim 6 wherein the light-source contains a first laser diode that emits a first laser beam and a second laser diode that emits a second laser beam, wherein the first laser beam generates a first light-point on the surface structure and the second laser beam generates a second light-point on the surface structure.

11. The position-determination system according to claim 10 wherein the first laser beam and the second laser beam are aligned mutually parallel.

12. The position-determination system according to claim 10 wherein at least two of the first laser diode and the second laser diode, the sensor, and a lens of the camera are integrated on a circuit board.

13. The position-determination system according to claim 1 wherein the reference pattern is a reference object that is arranged on the surface structure, and wherein the reference object lies in the capturing range of the camera when the elevator car is positioned at an associated portion of the travel path.

14. The position-determination system according to claim 13 wherein the reference object is one of a screw-head, a rail-fastening element, and a code-mark.

15. An elevator with the elevator car and the position-determination system according to claim 1 where in the analysis unit transmits the position of the elevator car or the velocity of the elevator car to an elevator control, wherein the elevator control, using of the position or the velocity, controls a drive unit to cause the elevator car to travel along the travel path.

* * * * *